United States Patent [19]
Murooka et al.

[11] Patent Number: 5,301,307
[45] Date of Patent: Apr. 5, 1994

[54] MICROPROCESSOR HAVING WAITING FUNCTION

[75] Inventors: Fumio Murooka, Yamato-Koriyama; Yuusuke Kajikawa; Kazuharu Date, both of Tenri; Hiroshi Mikami; Shigeki Imai, both of Nara; Katsuhiro Masui, Kashihara, all of Japan

[73] Assignee: Sharp Kabushiki Kaisha, Osaka, Japan

[21] Appl. No.: 828,214

[22] Filed: Jan. 30, 1992

[30] Foreign Application Priority Data

Feb. 6, 1991 [JP] Japan .................. 3-015431

[51] Int. Cl.$^5$ .............................. G06F 9/22
[52] U.S. Cl. ........................ 395/550; 395/375; 364/DIG. 1; 364/270; 364/270.3; 364/270.4; 364/262.4; 364/262.8; 364/271.5; 364/271
[58] Field of Search .......... 395/700, 500, 550, 325, 395/275, 375, 650, 775

[56] References Cited

U.S. PATENT DOCUMENTS

| | | | |
|---|---|---|---|
| 5,093,902 | 3/1992 | Tokumitsu | 395/100 |
| 5,125,088 | 6/1992 | Culley | 395/500 |
| 5,151,986 | 9/1992 | Langar et al. | 395/550 |
| 5,155,812 | 10/1992 | Ehlig et al. | 395/275 |
| 5,201,036 | 4/1993 | Yoshimatsu | 395/325 |
| 5,220,656 | 6/1993 | Itomitsu et al. | 395/375 |

Primary Examiner—Kevin A. Kriess

[57] ABSTRACT

A microprocessor capable of executing a micro-instruction output from a micro-memory according to an address which corresponds to an instruction to be executed at a time when each time the microprocessor receives the address is provided. The microprocessor includes a unit (a T1 cycle signal generator, a T2 cycle signal generator, a TW cycle signal generator) for generating a control signal for a period of time corresponding to a period of time of a waiting signal at a time when the waiting signal is received from the outside, and a unit (a microcode read-only memory, a read-only memory address latch, a read-only memory output latch, an address control circuit, a multiplexer) connected to the control signal generating unit (the T1 cycle signal generator, the T2 cycle signal generator, the TW cycle signal generator) for holding an address supplied to the micro-memory for a period of time corresponding to a period of time of the control signal.

3 Claims, 6 Drawing Sheets

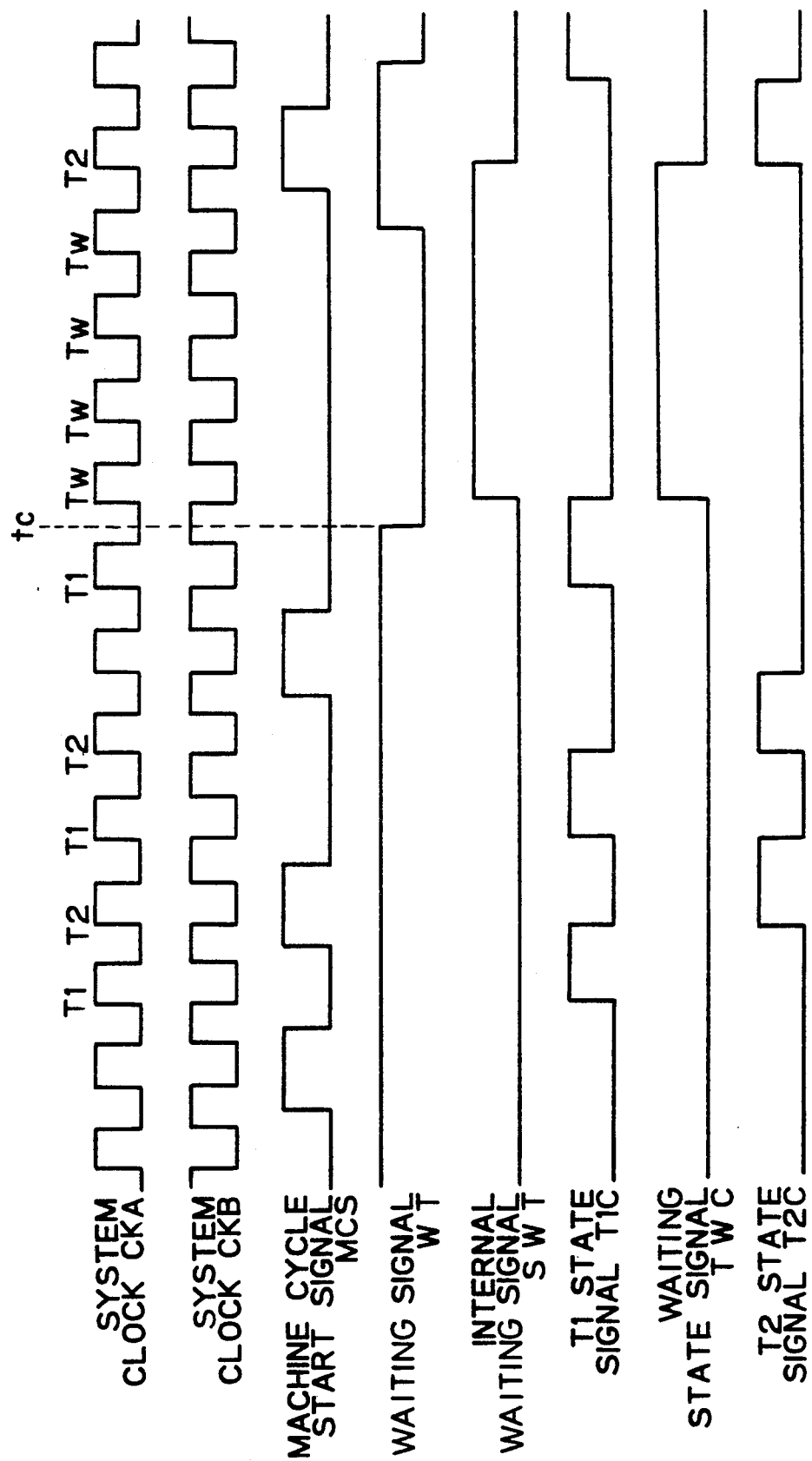

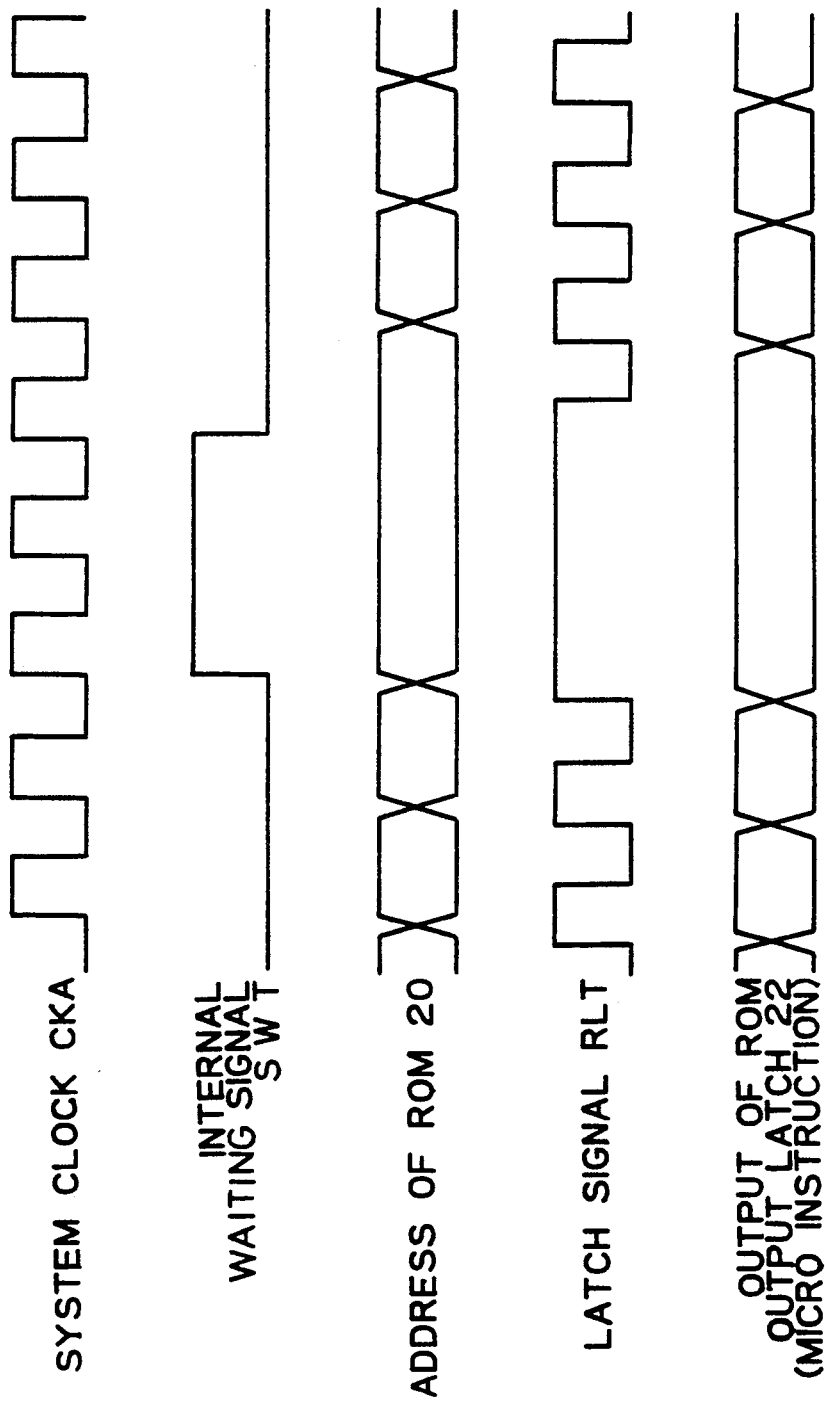

MICROPROCESSOR HAVING WAITING FUNCTION

BACKGROUND OF THE INVENTION

1. Field of the Invention

The present invention relates to a microprocessor having a waiting function, and more particularly, a microprocessor which is arranged to keep an address given to a read-only memory (ROM) for storing micro-instructions unchanged with respect to a given period of time in order to realize the waiting function.

2. Description of the Related Art

As a starting point, the inventors of the present invention used a commonly available microprocessor which was arranged to transit its internal state on a basis of a predetermined system clock for processing the data. When the microprocessor reads data from an external storage unit or a peripheral unit having a slow operating ratio, the system clock is stopped for blocking the transit of the state inside of the microprocessor as is required, thereby enabling a timing delay for data entry. In this state, apparently, the microprocessor is temporarily stopped.

However, the foregoing microprocessor is often kept waiting for a considerably long time, when the system clock remains inoperative. Therefore, in the case that a dynamic circuit is used in the microprocessor, the electric potential charged in the internal signal line is discharged, that is, made lower, resulting in disadvantageously changing the internal state of the microprocessor.

This disadvantage may be overcome if the microprocessor is composed of a static circuit. However, utilizing the static circuit makes a scale (size) of the circuit larger. This is another disadvantage.

SUMMARY OF THE INVENTION

It is therefore an object of the present invention to provide a microprocessor which is capable of keeping the waiting state without changing an internal state of a microcomputer in the case that an inside of the microprocessor is composed of a dynamic circuit.

The object of the present invention can be achieved by a microprocessor capable of executing a micro-instruction output from a micro-memory according to an address which corresponds to an instruction to be executed at a time when each time the microprocessor receives the address comprising a unit for generating a control signal for a period of time corresponding to a period of time of a waiting signal at a time when the waiting signal is received from the outside, and a unit connected to the control signal generating unit for holding an address supplied to the micro-memory for a period of time corresponding to a period of time of the control signal.

Preferably, the control signal generating unit includes a plurality of signal generators.

More preferably, the plurality of signal generators includes a T1 cycle signal generator capable of outputting a high-level T1 state signal indicating that a machine cycle is a T1 cycle during one period starting at a next leading edge of a system clock.

Furthermore preferably, the plurality of signal generators further includes a T2 cycle signal generator capable of outputting a high-level T2 state signal indicating that the machine cycle stays at a T2 cycle during one period starting at a next leading edge of the system clock at a time when the high-level T1 state signal is output.

The T2 cycle signal generator is preferably capable of outputting no T2 state signal in the case that a low-level waiting signal is given from an external source to the microprocessor.

The T2 cycle signal generator is further capable of outputting a high-level T2 state signal during one period of the system clock after a waiting signal is returned to a high-level state, preferably.

The plurality of signal generators further includes a TW cycle signal generator capable of generating an internal waiting signal, the internal waiting signal being risen in synchronization to a tailing edge of a next T1 state signal at a time when the waiting signal drops, and the internal waiting signal being dropped in synchronization with a leading edge of a next system clock after the waiting signal returns to a high level, preferably.

The TW cycle signal generator is further capable of outputting a waiting state signal indicating that the machine cycle is a waiting cycle, the waiting state signal changing in the same manner as that of the internal waiting signal, preferably.

The address holding unit preferably includes a multiplexer which is adapted to select one of two addresses and to output the selected one address.

The address holding unit further includes a read-only memory address latch connected to the multiplexer, the read-only memory address latch being adapted to give an address output from the multiplexer to the read-only memory, preferably.

The address holding unit preferably further includes a microcode read-only memory connected to the read-only memory address latch, the microcode read-only memory being adapted to store each instruction to be executed by the microprocessor, each instruction being composed of serial micro-instructions.

The address holding unit further includes a read-only memory output latch connected to the microcode read-only memory, the read-only memory output latch being adapted to latch the micro-instruction output by the microcode read-only memory on a basis of a predetermined latch signal, preferably.

The address holding unit further includes an address control circuit connected to both the multiplexer and the read-only memory output latch, the address control circuit being adapted to output to the multiplexer an address of a micro-instruction to be executed at a next clock cycle on a basis of a part of an instruction and a flag signal latched by the read-only memory output latch, preferably.

Preferably, the read-only memory address latch is further capable of supplying an address output from the multiplexer to the microcode read-only memory.

More preferably, the multiplexer is further capable of keeping the selected address output to a microcode read-only memory in the case that a high-level internal waiting signal is input to a read-only memory address latch.

The microprocessor further includes a microcode control circuit for controlling the microcode read-only memory, and an external signal control circuit for generating a signal for controlling timing on which data is output from or read into the microprocessor, preferably.

The microprocessor further includes a register file for storing data, and a register file control circuit for controlling reading or writing of the register file, preferably.

The microprocessor further includes an arithmetic logic unit for performing arithmetic operations, a control register for controlling the register, and an area pointer address bus control circuit for controlling an address bus, preferably.

In operation, when the wait signal is input to the microprocessor, the control signal generating unit serves to generate the control signal for holding an address on a basis of the input waiting signal and then output the resulting signal to the address holding unit. In response to the control signal, the address holding unit keeps the address for a predetermined period corresponding to the time when the signal is continued as it gives a constant address to a micro-memory. As a result, a constant micro-instruction is read from the micro-memory, so that the microprocessor repeats the same operation on a basis of this micro-instruction, that is, the microprocessor is kept waiting for the period.

As set forth above, the microprocessor of this invention has a capability of keeping the waiting state without having to stop the operation, that is, the system clock. Hence, if the microprocessor is composed of a dynamic circuit, no change takes place in the internal state of the microprocessor since the waiting state is kept.

Further objects and advantages of the present invention will be apparent from the following description of the preferred embodiment of the invention as illustrated in the accompanying drawings.

BRIEF DESCRIPTION OF THE DRAWINGS

FIG. 5 is a timing chart showing another operation of the microprocessor shown in FIG. 1; and FIG. 6 is a timing chart showing an operation of the ROM unit shown in FIG. 2.

DESCRIPTION OF THE PREFERRED EMBODIMENTS

Referring to the accompanying drawings, an embodiment of a microprocessor according to the present invention will be described in detail.

Figure 1:
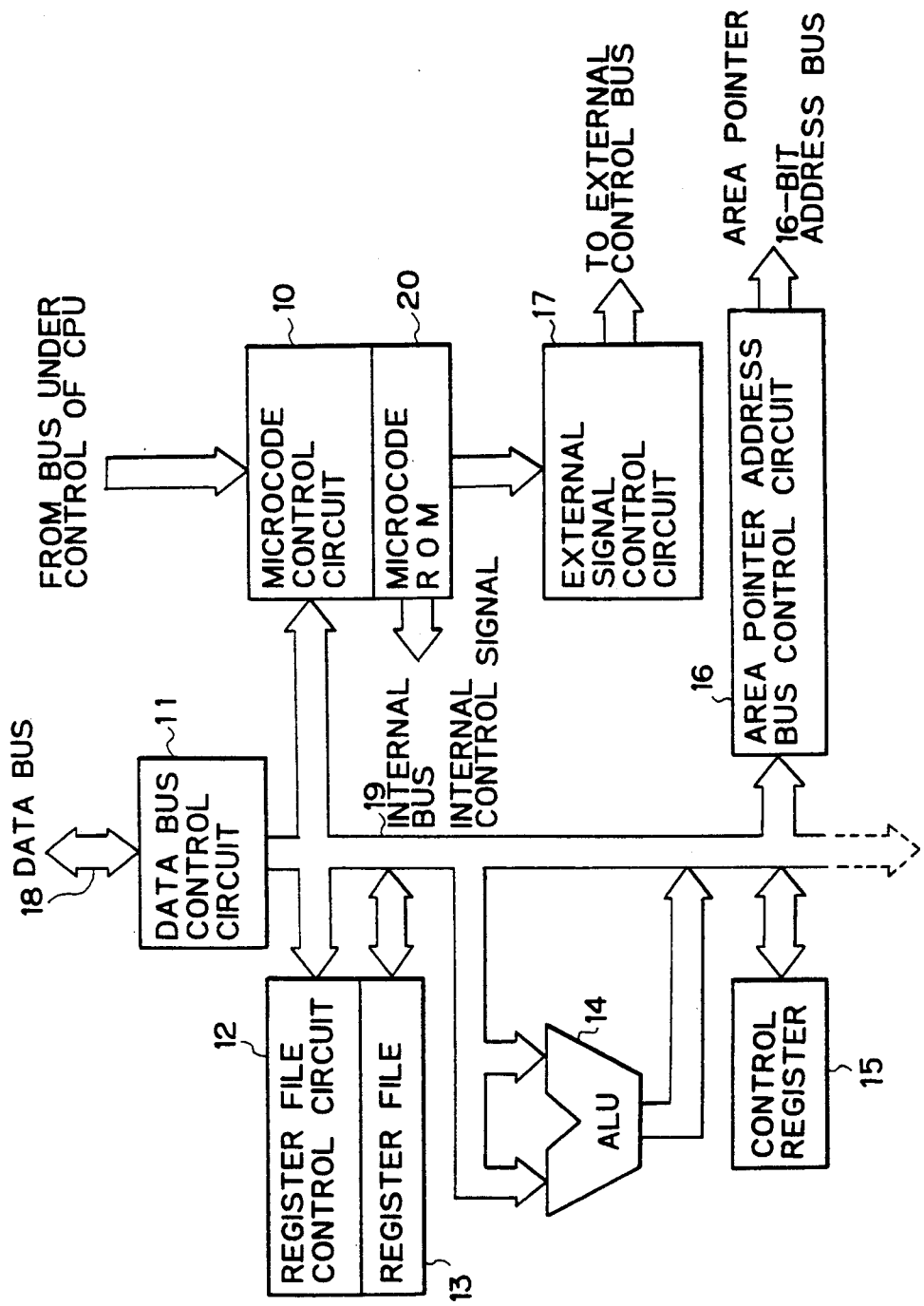
FIG. 1 is a block diagram showing arrangement of a microprocessor according to an embodiment of the present invention.

FIG. 1 shows a block diagram of a microprocessor according to the embodiment of the present invention.

As shown in FIG. 1, the microprocessor includes a microcode control circuit 10, a data bus control circuit 11, a register file control circuit 12, a register file 13, an arithmetic logic unit (ALU) 14, a control register 15, an area pointer address bus control circuit 16, an external signal control circuit 17, a data bus 18, an internal bus 19, and a microcode read-only memory (ROM) 20.

Each instruction to be executed by the microprocessor is composed of serial micro-instructions. These serial micro-instructions are stored in the microcode ROM 20. Based on the micro-instructions stored in the microcode ROM 20, the elements 11 to 17 of the microprocessor shown in FIG. 1 are all controlled in order to realize the data processing operation of the microprocessor.

The microcode control circuit 10 serves to control the microcode ROM 20. The external signal control circuit 17 serves to generate a signal for controlling the timing on which the data is output to the outside of the microprocessor and on which the data is read from the external source.

The register file control circuit 12 serves to control the timing on which the data is read from or written in the register file 13 and the address of the register file 13. The ALU 14 performs predetermined arithmetic operations. The area pointer address bus control register 15 is used for expanded peripheral macros. The control circuit 16 is used for an area pointer address bus, which circuit serves to control the output of the address according to the specified operation mode.

The microcode control circuit 10, the register file 13, the register file control circuit 12, the ALU 14, the control register 15 and the control circuit 16 are all connected to the 16-bit internal bus 19. The internal bus 19 is connected to the 8-bit data bus 18 through the data bus control circuit 11.

Figure 2:
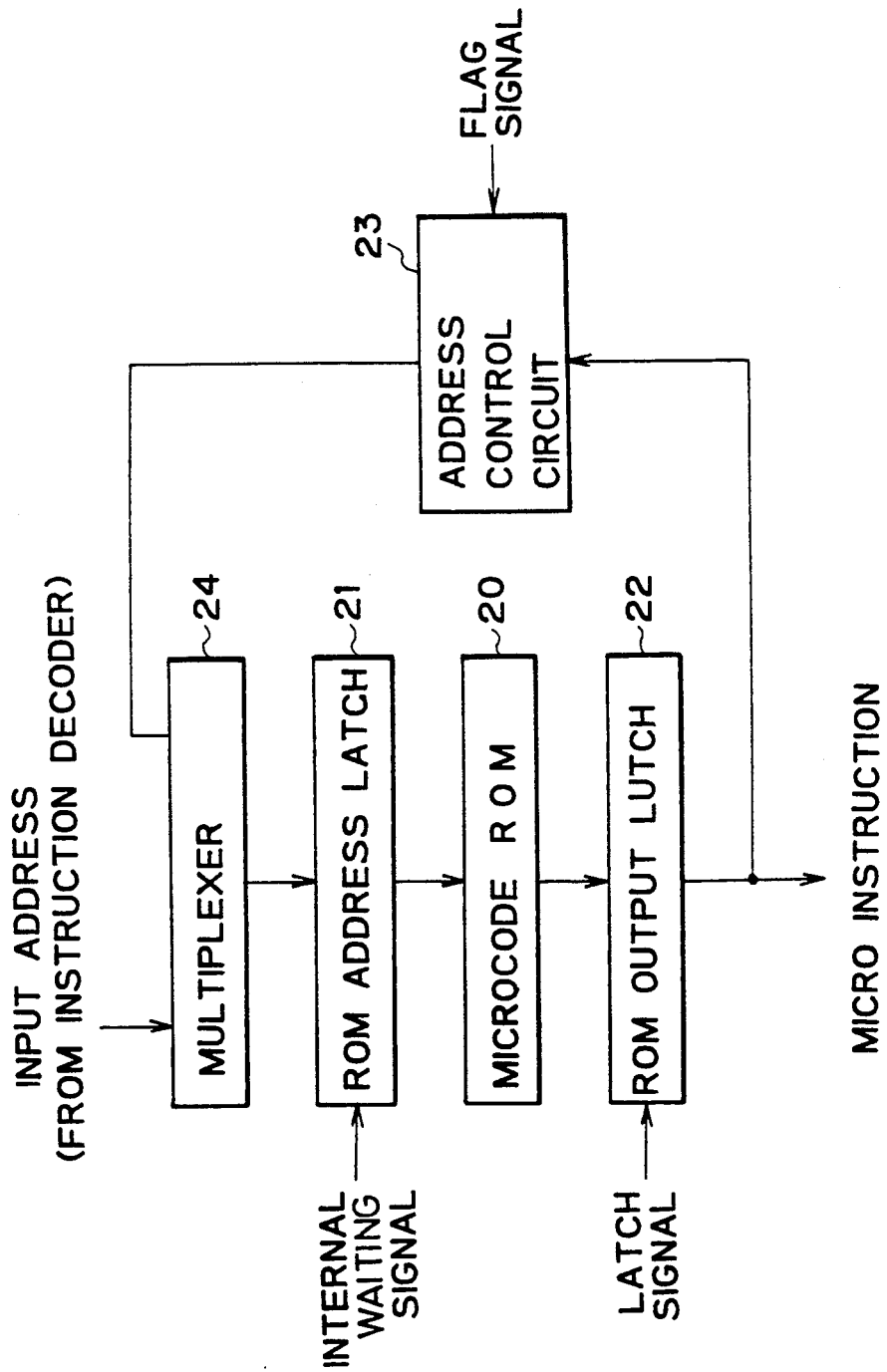
FIG. 2 is a block diagram showing a ROM unit for storing micro-instructions included in the microprocessor shown in FIG. 1.

Referring to FIG. 2, the microcode control circuit 10 and the microcode ROM 20 will be described in detail.

An address is given from both an instruction decoder (not shown) and an address control circuit 23 (to be described later) to the microcode ROM 20. The instruction decoder supplies to the microcode ROM 20 an address of the micro-instruction located at the head of the serial micro-instructions corresponding to a given instruction. The address control circuit 23 supplies addresses of the other micro-instructions.

A multiplexer 24 serves to select one of these two addresses and to output the selected one. A ROM address latch 21 serves to give an address output from the multiplexer 24 to the microcode ROM 20. In case that a high-level internal waiting signal (that is, an address holding signal) SWT is input to the ROM address latch 21, the multiplexer 24 serves to keep the selected address being output to the ROM 20.

A ROM output latch 22 serves to latch the micro-instruction output by the microcode ROM 20 based on a predetermined latch signal RLT. The address control circuit 23 serves to output to the multiplexer 24 the address of the micro-instruction to be executed at the next clock cycle, based on part of an instruction and a flag signal latched by the ROM output latch 22.

Figure 3:
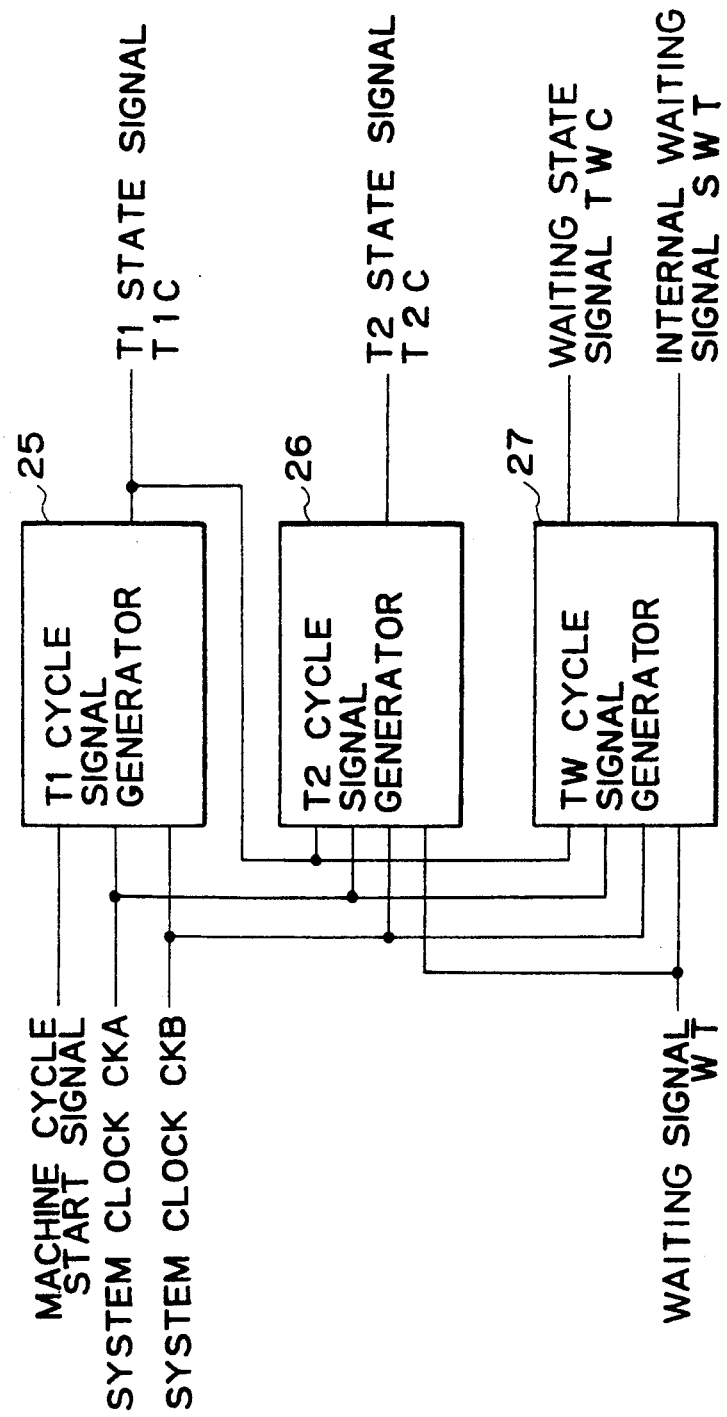
FIG. 3 is a block diagram showing a circuit for generating a signal indicating a machine cycle and an internal waiting signal of the microprocessor shown in FIG. 1.

A circuit shown in FIG. 3 is arranged to generate a T1 state signal T1C and a T2 state signal T2C indicating the T state of the microprocessor, and a waiting state signal TWC and an internal waiting signal SWT indicating the waited state of the microprocessor. The elements 25 to 27 shown in FIG. 3 all receive a system clock CKA and its reversed clock, that is, a system clock CKB. A T1 cycle signal generator 25 operates to output a high-level T1 state signal T1C indicating that the machine cycle is a T1 cycle during one period starting at the next leading edge of the system clock CKA.

A T2 cycle signal generator 26 serves to output a high-level T2 state signal T2C indicating that the machine cycle stays at the T2 cycle during one period starting at the next leading edge of the system clock CKA when the high-level T1 state signal T1C is output. In the case that the low-level (active) waiting signal WT is given from the external source to the microprocessor, no T2 state signal T2C is output. Instead, after the waiting signal WT is returned to a high-level state, the high-level T2 state signal T2C is output during one period of the system clock CKA.

A TW cycle signal generator 27 serves to generate an internal waiting signal SWT. The internal waiting signal SWT rises in synchronization to the tailing edge of the next T1 state signal T1C when the waiting signal WT drops (enters into an active state) and drops in synchronization with the leading edge of the next system clock CKA after the waiting signal WT returns to the high level. Further, the TW cycle signal generator 27 serves to output a waiting state signal TWC indicating that the machine cycle is a waiting cycle. The waiting state signal TWC changes in the same manner with the internal waiting signal SWT.

Figure 4:
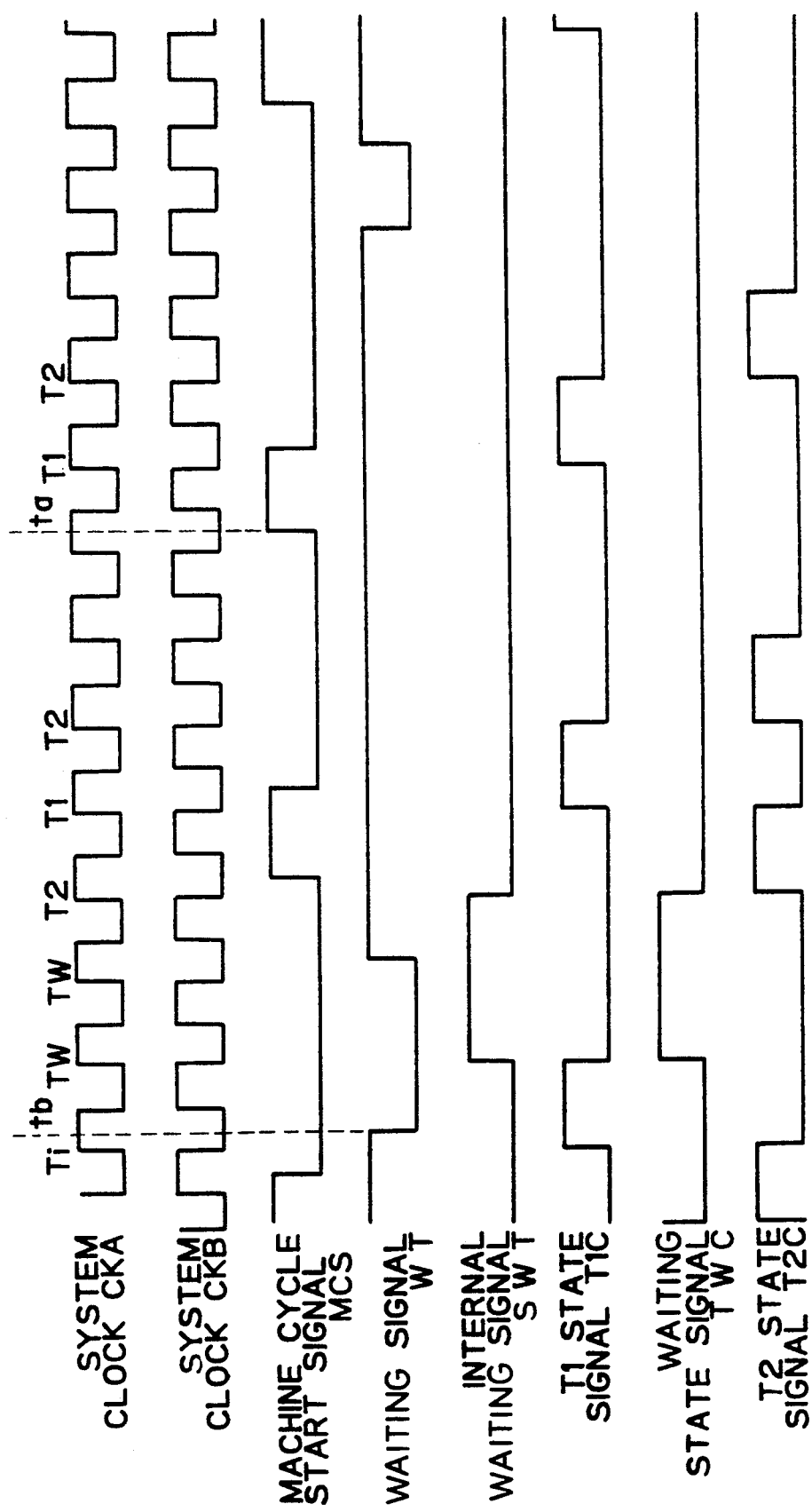
FIG. 4 is a timing chart showing an operation of the microprocessor shown in FIG. 1.

The operation of the microprocessor will be described with reference to a timing chart of FIG. 4. For example, when at a timing point ta, a machine cycle start signal MCS raises its level, one period subsequent to the next leading edge of the system clock CKA becomes a T1 cycle (denoted by T1). During the period, the T1 cycle signal generator 25 keeps the high-level T1 state signal T1C being output. The next one period becomes a T2 cycle (denoted by T2). During the period, the T1 cycle signal generator 25 keeps the high-level T2 state signal T2C being output. In the T1 cycle, the multiplexer 24 (see FIG. 2) serves to select an address sent from the instruction decoder, and the ROM address latch 21 gives the microcode selected address to the ROM 20. Then, the ROM microcode 20 serves to output the first micro-instruction, and the latch ROM output 22 serves to latch the output instruction and to output it as a code for controlling each block of the microprocessor. In the next T2 cycle, the address control circuit 23 operates to supply the address of the micro-instruction to be executed in the T2 cycle to the multiplexer 24, based on the part of the code latched by the latch ROM output 22 and the flag signal, for example.

Next, the multiplexer 24 supplies the address to the microcode ROM 20 through the ROM address latch 21. Then, the microcode ROM 20 outputs the micro-instruction stored in the address. The ROM output latch 22 serves to latch the instruction code.

Next, the operation of the microprocessor when it is waiting will be described with reference to FIG. 4. Assuming that the waiting signal WT given from the outside to the microprocessor drops to the low level at the timing point tb, the TW cycle signal generator 27 serves to output the high-level internal waiting signal SWT and the waiting state signal TWC in synchronization with the leading edge of the T1 state signal T1C. The TW cycle signal generator 27 keeps these two signals at high levels while the waiting signal stays at low level (during the interval between two cycles each denoted by TW).

Returning the waiting signal WT to the high level, the internal waiting signal SWT and the waiting state signal TWC are returned to the low level in synchronization with the leading edge of the next system clock CKA.

FIG. 5 is a timing chart which assumes that the waiting signal WT continues for a considerably long period. Concretely, at the timing point tc, the waiting signal WT drops to the low level, the internal waiting signal SWT and the waiting state signal TWC drop to the low level over the four cycles, during which the waiting cycle is continued.

Referring to FIG. 6, the description will be directed to the operation of the circuit shown in FIG. 2 at a time when the high-level internal waiting signal SWT is output. When the internal waiting signal SWT stays at a low level, the ROM address latch 21 serves to latch the address output from the multiplexer 24 along the period of the system clock CKA and give the latched address to the microcode ROM 20. The micro-instruction output from the ROM 20 changes according to the period of the system clock as well.

However, when the TW cycle signal generator 27 outputs the high-level internal waiting signal SWT, the ROM address latch 21 serves to hold the address without updating the address. Hence, the same micro-instruction is kept to be output from the microcode ROM 20, with a result of keeping the micro-instruction output by the ROM output latch 22 to be a constant. During this interval, the same micro-instruction is repetitively executed, so that the microprocessor stays in the waiting state.

Returning the internal waiting signal SWT to the low level, the ROM address latch 21 serves to latch the address along the period of the system clock CKA again and the microcode ROM 20 serves to output the micro-instruction corresponding to the address.

It will be understood from the above description that the microprocessor according to the embodiments of the present invention is capable of realizing the waiting state without stopping a supply of the system clock to each section of the microprocessor, thereby resulting in keeping the internal state of the microprocessor even while the microprocessor stays in the waiting state.

Many widely different embodiments of the present invention may be constructed without departing from the spirit and scope of the present invention. It should be understood that the present invention is not limited to the specific embodiments described in the specification, except as defined in the appended claims.

What is claimed is:

1. A microprocessor capable of executing a micro-instruction output from a micro-memory according to an address which corresponds to an instruction to be executed at a time when each time said microprocessor receives said address, said microprocessor comprising:
   control signal generating means for generating a control signal for a period of time corresponding to a period of time of a waiting signal at a time when said waiting signal is received from the outside; and
   address holding means connected to said control signal generating means for holding an address supplied to said micro-memory for a period of time corresponding to a period of time of said control signal,
   said control signal generating means including a plurality of signal generators,
   said plurality of signals generators including a T1 cycle signal generator capable of outputting a high-level T1 state signal indicating that a machine cycle is a T1 cycle during one period starting at a next leading edge of a system clock,
   said plurality of signal generators further including a T2 cycle signal generator capable of outputting a high-level T2 state signal indicating that said machine cycle stays at a T2 cycle during one period starting at a next leading edge of said system clock at a time when said high-level T1 state signal is output, said T2 cycle signal generator failing to output a T2 state signal in the case that a low-level waiting signal is given from an external source to said microprocessor, said T2 cycle signal generator being further capable of outputting said high-level T2 state signal during one period of said system clock after said waiting signal is returned to a high-level state.

2. A microprocessor capable of executing a micro-instruction output from a micro-memory according to an address which corresponds to an instruction to be executed at a time when each time said microprocessor receives said address, said microprocessor comprising:

control signal generating means for generating a control signal for a period of time corresponding to a period of time of a waiting signal at a time when said waiting signal is received from the outside; and address holding means connected to said control signal generating means for holding an address supplied to said micro-memory for a period of time corresponding to a period of time of said control signal, said control signal generating means including a plurality of signal generators, said plurality of signal generators including a T1 cycle signal generator capable of outputting a high-level T1 state signal indicating that a machine cycle is a T1 cycle during one period starting at a next leading edge of a system clock, said plurality of signal generators further including a T2 cycle signal generator capable of outputting a high-level T2 state signal indicating that said machine cycle stays at a T2 cycle during one period starting at a next leading edge of said system clock at a time when said high-level T2 state signal is output, said plurality of signal generators further including a TW cycle signal generator capable of generating an internal waiting signal, said internal waiting signal being risen in synchronization to a tailing edge of a next T1 state signal at a time when said waiting signal drops, and said internal waiting signal being dropped in synchronization with a leading edge of a next system clock after said waiting signal returns to a high level.

3. A microprocessor according to claim 2, wherein said TW cycle signal generator is further capable of outputting a waiting state signal indicating that said machine cycle is a waiting cycle, said waiting state signal changing in the same manner as that of said internal waiting signal.

* * * * *